Nov. 29, 1932.  H. BRANDL ET AL  1,889,190
WET GAS METER
Filed Aug. 1, 1929   4 Sheets-Sheet 1
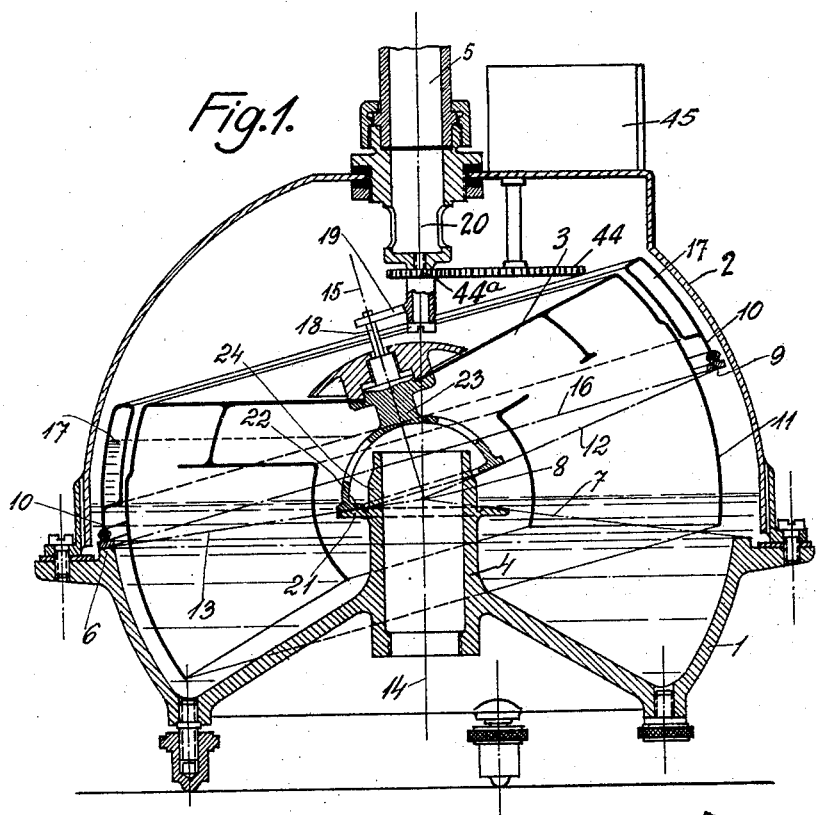
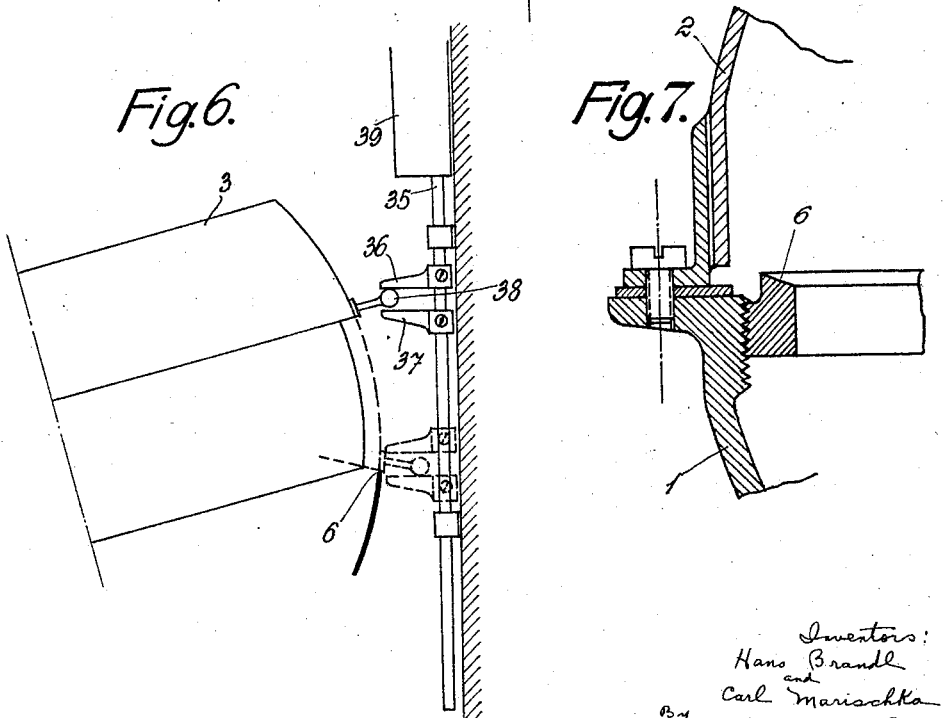

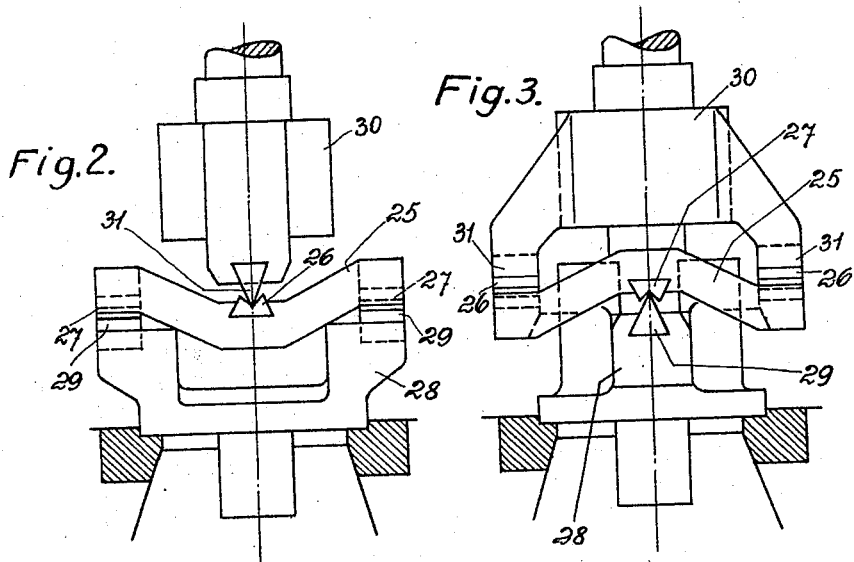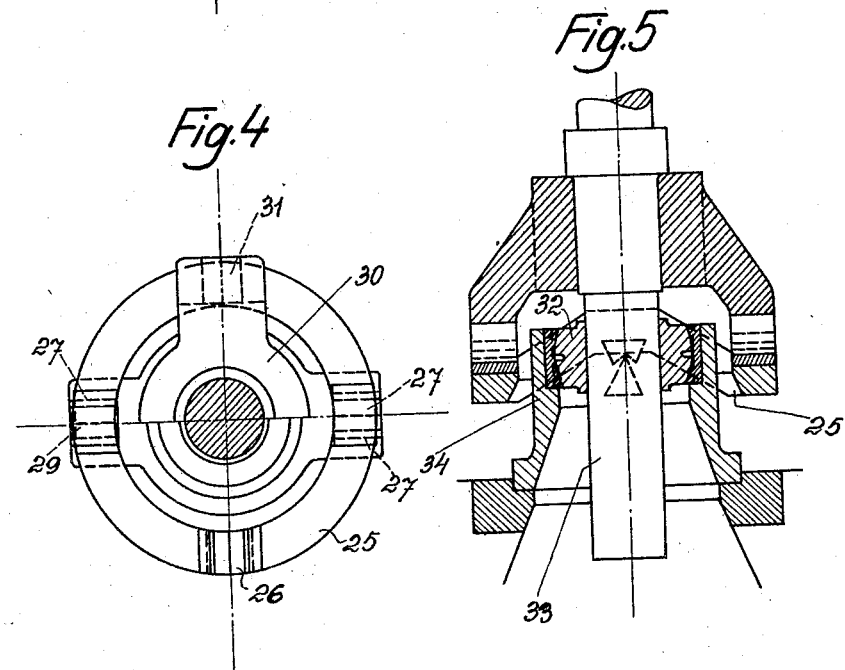

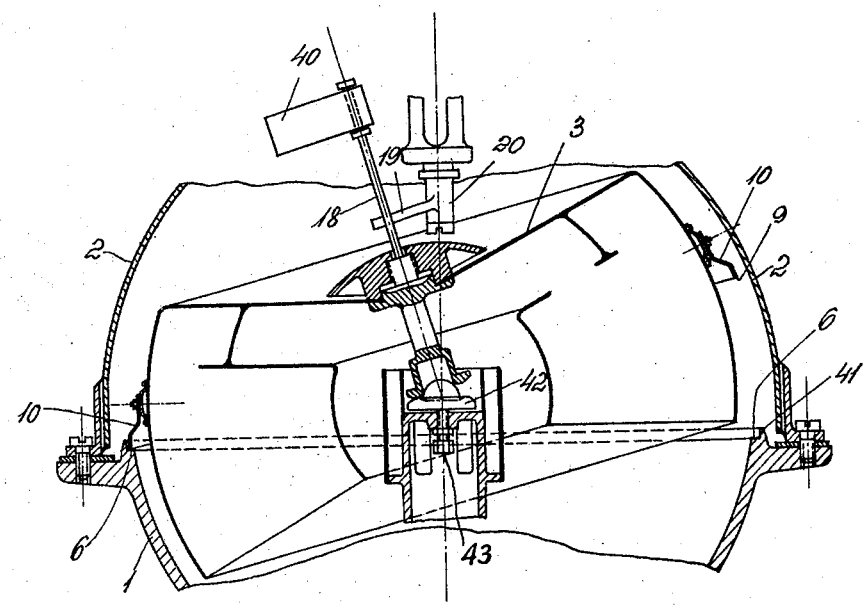

Nov. 29, 1932.  H. BRANDL ET AL  1,889,190
WET GAS METER
Filed Aug. 1, 1929  4 Sheets-Sheet 4

Patented Nov. 29, 1932

1,889,190

UNITED STATES PATENT OFFICE

HANS BRANDL AND CARL MARISCHKA, OF VIENNA, AUSTRIA, ASSIGNORS TO B. M. GASMESSER AKTIENGESELLSCHAFT, OF LUXEMBURG, LUXEMBURG

WET GAS METER

Application filed August 1, 1929, Serial No. 382,666, and in Austria February 25, 1929.

Wet gas meters with a tumbler bell, are already known in which the tumbling or swashplate movement is produced by the gas passing through the gas meter. The control of the flow of gas which is intended to ensure the driving in a continuous swashplate movement as long as gas is passing, is effected by a corresponding subdivision of the inner space of the bell, or by specially arranged conduits, for which there are various constructions. In all these hitherto known gas meter constructions, the swashplate movement of the bell is kinematically determined by a special method of mounting and of guiding the axis of the bell. As during the swashplate movement the geometrical axis of the bell describes a cone with a downward apex, the bell guiding device was kinematically designed in such a manner that the bell was provided with a spindle or pin passing through it, which was held at the bottom in a universal bearing and guided at the top by a crank arm. It was merely necessary to take care that the bell should not be able to turn about its pin, and then a positive swashplate guiding was obtained.

This method of swashplate guiding of the bell has however fairly considerable drawbacks, more particularly in the case of gas meters. The bearing surfaces of the universal joint are exposed to the full weight of the tumbler bell, and the crank has also to take up considerable pressures. The universal joint as well as the necessary joint between the upper end of the pin and the crank engaging with it, require therefore careful and ample lubrication if wearing out of the surfaces of these joints, which slide upon each other, is to be avoided. As however the whole mechanism is enclosed in a casing, and lubrication of these joints, at least by simple means, is hardly possible, it is clear that the sensitiveness and accuracy of such a gas meter will be greatly reduced after a relatively short period of working.

In the kinematics of the swashplate it is also known to produce a swashplate movement of a disc by connecting it theoretically to a cone which rolls on a second stationary cone.

This principle of guiding, known in theory, is applied according to the present invention to the tumbler bell of gas meters, and in order to make it clear, together with its advantages in this application, reference is made to the accompanying drawings, in which Fig. 1 shows a vertical section of a gas meter;

Figs. 2, 3 and 4 show a special construction of a Cardan-joint in two side elevations and in a plan view respectively;

Fig. 5 is an axial section of a combined Cardan-and-ball joint;

Fig. 6 a mode of execution of a mechanism for driving the counting device by the tumbler bell;

Fig. 7 a portion of the guiding rail of the tumbler bell, and

Figure 9:
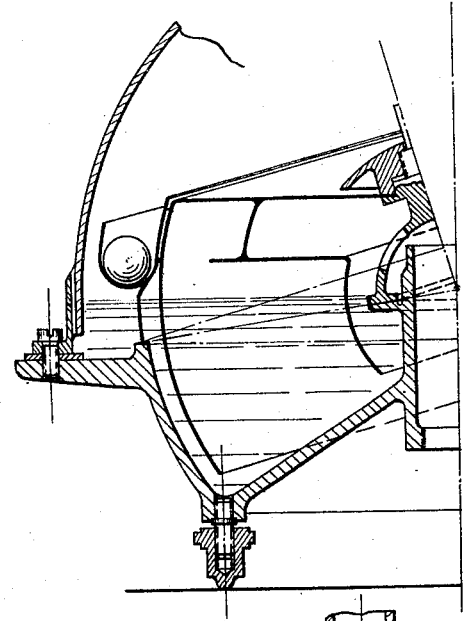
Figure 10:
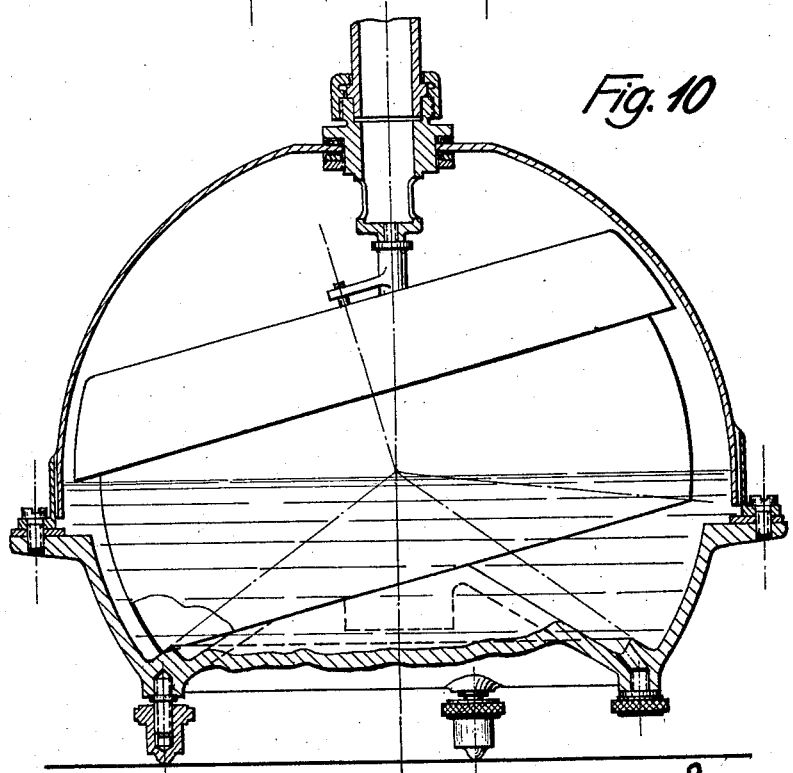

Figs. 8, 9 and 10 show some details of the gas meter in a modified form.

In the casing comprising a lower portion 1 and an upper portion 2, is mounted the tumbler bell 3 which is subdivided by partitions or provided with conduits in any manner suitable for controlling the flow of gas. The lower portion of the casing 1, 2 is filled with water and owing to the swashplate movement, the control edges of the bell alternately dip in and emerge and close and uncover the gas passages. The gas is admitted from the bottom through the vertical central branch 4 of the casing into the bell 3, passes through the latter, at the same time imparts to it a swashplate motion, enters into that portion of the casing above the bell and then escapes through the pipe 5 into the consumer's pipe. The movement of the tumbler bell is transmitted in any desired manner to a counting mechanism.

In the construction of gas meter according to the invention, shown in the drawings, the bottom part 1 of the casing is provided with an annularly extending guide surface 6 which belongs geometrically to the surface of a vertical circular cone 7 which is shown in the drawings by chain lines, and the apex 8 of which is situated in the centre of oscillation of the tumbler bell 3. On the said guide tracks 6 rolls an annular surface 9 provided on the tumbler bell 3 and extending completely around it, the said surface being made here in the form of the end boundary of a separate surface 10 provided on the bell.

The bottom edge of the main surface 11 of the bell 3 may of course also be utilized as the rolling surface for which a correspondingly arranged guide track having the function of the guide track 6 shown in this case, would then have to be provided (Fig. 10).

The annular surface 9 of the bell 3 is situated on the surface of a cone 12 which is also indicated in the drawings by chain lines, and the apex of which directed downwards, coincides with the apex 8 of the cone 7. The two cones 7 and 12 are in contact with each other at any moment along a generatrix 13, so that whilst the axis 14 of the cone 7 is vertical, the axis 15 of the cone 12 is inclined, and when the cone 12 rolls on the cone 7, the said axis 15 will in its turn describe a conical surface, the axis of which is the axis 14 and the apex of which is at 8. During this rolling the base surface 16 of the cone 12 makes a pure swashplate movement, and in the same way also of course the bell 3 which is in a way rigidly secured to the said cone 12.

As already stated, the guiding of a swashplate by two cones rolling on each other, is already known in kinematics. For ensuring a positive rolling however, the crank guide at the free end of the axis of the tumbler disc was hitherto retained in the kinematics, and as a matter of fact, it is necessary to have a guide which would avoid interruptions of the rolling movement through any lifting off of the rolling cone from the stationary one. The crank guiding of the gyrating end of the axis of the plate still requires however joints which have the drawbacks already mentioned. When the crank guiding of the gyrating end of the swashplate axis is retained, the difference between the kinematics described last and the kinematics described first, will be that the universal joint for supporting the bottom end of the swashplate axis has been replaced by the frusto-conical rolling guide, all the rest remaining without any change.

The substitution for the universal joint of a frusto-conical rolling guide for gas meters of the kind firstly specified, has however particularly important advantages which have not been recognized up to now and which consist substantially in the possibility of considerably simplifying the construction of such a gas meter and to dispense with lubrication of the surface rolling up on each other, whilst at the same time a sensitiveness of the gas meter is ensured, such as could not be attained in any of the hitherto known methods of mounting the tumbler bell.

As shown in Fig. 1, the rolling guide surfaces could be placed on the circumference of the bell, with the result that with bells of considerable weight, only a very small specific load will act on the guide surfaces, so that any wearing out of these surfaces need not be taken into account in practice. At the same time, the bell rolls like a big wheel (development of the circumference of the bell) on a bar, only a slight rolling friction being produced and a high sensitiveness of the bell drive ensured. But if the guiding of the bell axis at the bottom in a universal joint, and at the top by a crank, were also retained, and the frusto-conical rolling guide just described were added, advantages would be obtained owing to the universal joint being relieved of the weight of the bell and therefore acting not as a support or bearing for the bell, but merely as a guide in which the specific surface loads would be relatively small.

But even when using this frusto-conical roll surface guiding, it is possible to dispose of the necessity of an upper crank guide and of the drawbacks associated with it. In the construction shown in Figure 1, on the tumbler bell 3 is provided an annular conduit 17 extending completely around it, in which is contained a certain quantity of mercury or some other liquid. This mercury or other liquid collects at a point of the periphery of the annular conduit 17 and owing to its weight, presses down the bell 3, owing to which a point or a generatrix of the surface 9 comes in contact with the surface 6. When the gas flow exerts on the tumbler bell 3 a torque moving about in a circle, the two frusto-conical surfaces will roll on each other in the manner described, the generatrices 13, along which the two frusto-conical surfaces are in contact with each other, revolving in a way about the axis 14 (a real rotation does not of course take place, only the point of contact moves round the axis 14). The mercury in the annular conduit 17 always collects at the point which is the lowest at the time and coincides with the point of contact, and this mercury constitutes therefore a running load which ensures continuity of the rolling process and prevents the bell from being tipped or tilted by the gas pressure, which would interrupt the continuity of the rolling.

When such a revolving load of the tumbler bell is used, a force-controlled guiding will be obtained, unlike the positive guiding hitherto used in such constructions and produced by the crank; this force-controlled guiding imparts however, with a suitable value of the revolving load weight, perfect security against lack of continuity. This force-controlled guiding could however be produced also in some other way than by a liquid weight, namely by means of a ball or roller (Fig. 9) travelling in a groove or through an annular conduit, or by means of a rotatable weight 40 provided at the upper end of the pin 18 extended if required (see Fig. 8). In each of these cases, the pivoting of the pin 18 of the tumbler bell 3 to a crank can be avoided. In the construction illustrated, the arm 19 of the sleeve 20 which drives the wheels 44 and 44a of the counting mechanism 45 in any desired manner, is used only as a driver or tappet with which engages loosely the pin 18 of the bell 3.

The frusto-conical rolling surfaces may be arranged and constructed in various ways. Thus for instance the frusto-conical rolling surface 9 of the bell 3 may be made so narrow that it shrinks to a preferably rounded-off edge see Fig. 8 which rolls on the wider frusto-conical surface 6. Conversely, the surface 6 could however be also reduced to an edge provided that the surface 9 is widened. When one of the surfaces which roll on each other, is reduced to an edge, the other one may be made in the form also of a flat annular surface or of frusto-conical surface with any desired inclination. This makes it possible then to modify the inclination of the bell, as will be mentioned later on.

The rolling surfaces may however be also multiplied. In the construction illustrated in Fig. 1, in addition to the peripheral portion of the frusto-conical rolling surfaces, there is also obtained a portion of these frusto-conical surfaces, situated near the central axis, namely by a flange 21 of the central branch 4, and by a flange 22 of a central part 23 connected to the bell. In this way, the stability of the bell guiding is increased by supporting the central part of the bell, owing to which any other methods of supporting, for instance by means of universal joints or the like, become unnecessary, and the specific surface pressure between the parts rolling on each other, is still further reduced. At the same time this central guiding may also be used for providing security against radial movement of the bell. The branch 4 is provided with a spherical guide surface 24 on which the circular inner boundary of the flange 22 of the central part 23 is guided during the swashplate movement of the bell. This constitutes a kind of ball joint by means of which the bell 3 is connected to the branch 4; as however this joint has not to support the weight of the bell, but only prevent radial movements of the bell on the guide surfaces 6 and 21, the stresses on the sliding surfaces of this joint are naturally small, and even without any lubrication, no perceptible wear will take place. The sensitiveness of the bell drive will also be affected thereby only to an immaterial extent.

In order to prevent radial movements of the bell during its swashplate movement, other means may also be used. Thus for instance the lower end of the bell pin may rest on a socket-like or step bearing (see Fig. 8). The guide surface 6 may also be provided, either inside or outside, with a guide flange 41 for the casing 10 of the bell 3, made entirely simple, and in both cases the ball guiding in the central part could be dispensed with.

If a cone rolling guide is provided only at the circumference of the bell, it is advisable to guide the bell in the centre by means of a universal joint, and according to the invention this may be done, for the purpose of reducing the friction losses to a minimum, for instance as shown in Figures 2, 3 and 4 in two elevations at right angles to each other, and in plan.

It is a question here of a knife edge universal joint, the friction losses of which are as small as those of the usual knife edge bearings. This joint is constituted by a double cranked ring 25 which carries at its upper side, at each of two opposite "recesses", a radially arranged knife edge bearing 26, and in a diameter at right angles to the same, at the lower side of the "rising portions" of the ring, the knife edge bearings 27. Under the ring 25 is arranged a bracket 28 with the two knife edges 29 which engage with the bearings 27, and above the ring is arranged the bracket 30 with the two knife edges 31 which engage with the bearing 26 of the ring 25. The bracket 28 is rigidly secured to the casing of the gas meter, and the bracket 30 to the bell, and it is clear that in this way a Cardan joint is obtained, with knife edges in place of the usual hinge joints.

In order to relieve the knife edges of the joint from radial stresses, in the hollow space of the ring 25 there may further be provided a ball joint as shown in Figure 5. This ball joint comprises a ring 32 bounded outside by a spherical surface, which ring is loosely mounted on the pin 33 of the bell, and can therefore move in the axial direction, and the hollow body 34 which surrounds with its hollow spherical bearing surface the ring 32 is secured in any desired way to the branch 4 of the casing. The centre of the ball joint must of course always coincide with that of the knife edge Cardan joint.

In addition to the frusto-conical rolling track, the bell is supported by the knife edge Cardan joint, and the object of the ball joint is merely to protect the knife edges from those unfavorable stresses which might be produced by radial movements of the bell. Here also, the ball joint is therefore exposed only to very slight stresses, and affects therefore the sensitiveness of the drive only to a negligible extent.

It is obvious that, conversely, the ring 25 may be provided with knife edges which engage with knife edge bearings or supports of the brackets 28 and 30. Other changes in the arrangement of the knife edges and bearings are also possible.

If such a knife edge Cardan joint is combined only with the frusto-conical rolling guide 6, 9 of Figure 1, the advantage will be obtained over the well-known tumbler bell guides with universal joint, that the upper crank guiding could be dispensed with. If the knife edge Cardan joint is combined with a bell with the frusto-conical rolling guides 6, 9 and 21, 22, it will not be loaded at all by the weight of the bell, but will be used merely for centering.

In any case therefore the result of the arrangements here described will be that of the hitherto required guide members of the tumbler bell, which are exposed to heavy stresses, require lubrication and reduce the sensitiveness of the drive produced by the gas, at least one part or even all, could be replaced by members which are more or less free from the drawbacks mentioned.

The guide bar 6 may be made into a separate member (see Fig. 7) vertically adjustable within the casing, as by means of a screw-threaded connection therewith, in order to enable the inclination or also the height of the bell in the casing to be modified for the purposes of calibration. Conversely, the casing 10, or a part of the same, may also be mounted on the bell and threadedly adjustable in the axial direction (see Fig. 8), owing to which the same adjustability may be ensured, and the calibration of the gas meter thereby rendered possible. The inclination of the bell may also be modified by changing the height of the central support 42 of the bell by means of a screw 43 (see Fig. 8.)

For the purpose of a differential calibration, there may also be used the transmission of the bell movement to the counting mechanism, by using the transmission diagrammatically shown in Figure 6. In the gas meter casing is mounted in a vertically easily adjustable manner a bar 35 to which are adjustably secured two arms 36 and 37 between which projects a tappet 38 secured to the bell surface 10, so that during the swashplate movement of the bell, the tappet 38 will strike alternately the upper and the lower arm 36 or 37, and move the bar 35 upwards and downwards. At each complete swashplate movement of the bell, the bar will be moved once upwards and downwards, and this movement is transmitted to the counting gear 39 of the gas meter. These arms 36 and 37 are secured to the bar in an adjustable manner. When the two arms 36 and 37 are set on the bar 35 so that both are in contact with the tappet 38, one from the top and the other from the bottom, the travel of the bar 35 will be exactly equal to the amplitude of oscillation of the bell.

If however, the arms 36 and 37 are moved on the bar 35 away from each other in such a manner that the tappet 38 can freely move between them, before it strikes one of the arms, the bar 35 will be moved in the manner of a drag slide, and its travel will be the smaller, the greater the distance apart of the arms 36 and 37. The transmission of the swashplate movement of the bell to the counting mechanism which is driven by the bar 35, can be therefore altered, which makes exact calibration possible.

The conditions will be the same when to the bar 35 is secured only one arm which projects between two stops of the bell.

It is obvious that the methods of adjustment described may also be combined with one another. The construction of the gas meter in its entirety and also in that of its single parts admits of many modifications.

What we claim as our invention is:

1. In a gas meter, the combination of a casing, a tumbler-bell movably arranged therein, means whereby the flow of fluid through said casing causes swashplate movement of the bell, and a pair of annular smooth surfaces adapted to roll on each other and to guide thereby the swashplate movement of the tumbler-bell, one of the annular surfaces being fixed relatively to said casing and serving as support for the tumbler-bell, the other annular surface being fixed relatively to said tumbler-bell.

2. In a gas meter, the combination of a casing, a tumbler-bell movably arranged therein, means whereby the flow of fluid through said casing causes swashplate movement of the bell, and a pair of smooth frusto-conical surfaces located adjacent the outer circumference of the tumbler-bell adapted to roll on each other and to guide thereby the swashplate movement of the tumbler-bell, one of the frusto-conical surfaces being fixed relatively to said casing, the other annular surface being fixed relatively to said tumbler-bell.

3. In a gas meter, the combination of a casing, a tumbler-bell movably arranged therein, means whereby the flow of fluid through said casing causes swashplate movement of the bell, a pair of annular surfaces adapted to roll on each other and to guide thereby the swashplate movement of the tumbler-bell, one of the annular surfaces being fixed relatively to said casing and serving as support for the tumbler-bell, the other annular surface being fixed relatively to said tumbler-bell, and means for ensuring the continuity of the rolling contact of the annular surfaces rolling on each other, said means comprising a weighted body adapted to act on the successive areas of contact of said annular surfaces rolling on each other.

4. In a gas meter, the combination of a casing, a tumbler-bell movably arranged therein, means whereby the flow of fluid through said casing causes swashplate movement of the bell, a pair of smooth annular surfaces adapted to roll on each other and to guide thereby the swashplate movement of the tumbler-bell, one of the surfaces being fixed relatively to said casing, the other surface tapering being fixed relatively to said tumbler-bell, and means including a shiftable weighted body carried by the tumbler-bell and acting on the successive areas of contact of said surfaces rolling on each other so as to positively ensure the continuity of contact of the latter.

5. In a gas meter, the combination of a casing, a tumbler-bell movably arranged therein and provided with an annular conduit, means whereby the flow of fluid through said casing causes swashplate movement of the bell, a pair of annular surfaces adapted to roll on each other and to guide thereby the swashplate movement of the tumbler-bell, one of the surfaces being fixed relatively to said casing, the other surface being fixed relatively to said tumbler-bell, and a liquid weight contained in the said annular conduit of the tumbler-bell for ensuring the continuity of the rolling contact of the said surfaces rolling on each other.

6. In a gas meter, the combination of a casing, a tumbler-bell movably arranged therein and provided with a central pin, means whereby the flow of fluid through said casing causes swashplate movement of the bell, a pair of annular surfaces adapted to roll on each other and to guide thereby the swashplate movement of the tumbler-bell, one of the surfaces being fixed relatively to said casing, the other surface being fixed relatively to said tumbler-bell, and a shiftable weight secured to the central pin of the tumbler-bell for ensuring the continuity of the rolling contact of the said surfaces rolling on each other.

7. In a gas meter, the combination of a casing, a tumbler-bell movably arranged therein, means whereby the flow of fluid through said casing causes swashplate movement of the bell, and a pair of annular smooth surfaces adapted to roll on each other and to guide thereby the swashplate movement of the tumbler-bell, one of the annular surfaces being fixed relatively to said casing, the other annular surface being fixed relatively to said tumbler-bell, the rolling portion of one of the annular surfaces of the pair being shaped as a circular edge, said edge being successively in contact with the other surface of said pair.

8. In a gas meter, the combination of a casing, a tumbler-bell movably arranged therein, means whereby the flow of fluid through said casing causes swashplate movement of the bell, and a pair of annular smooth surfaces adapted to roll on each other and to guide thereby the swashplate movement of the tumbler-bell, one of the annular surfaces being fixed relatively to said casing, the other annular surface being fixed relatively to said tumbler-bell, the rolling portion of one of the annular surfaces of the pair being shaped as a circular edge, the rolling portion of the other corresponding annular surface being flat.

9. In a gas meter, the combination of a casing, a tumbler-bell movably arranged therein, means whereby the flow of fluid through said casing causes swashplate movement of the bell, and a pair of annular smooth surfaces adapted to roll on each other and to guide thereby the swashplate movement of the tumbler-bell, one of the annular surfaces being fixed relatively to said casing, the other annular surface being fixed relatively to said tumbler-bell, the rolling portion of one of the annular surfaces of the pair being shaped as a circular edge, the other corresponding annular surface being frusto-conical.

10. In a gas meter, the combination of a casing, a tumbler-bell movably arranged therein, means whereby the flow of fluid through said casing causes swashplate movement of the bell, a pair of annular smooth surfaces located adjacent the circumference of the tumbler-bell adapted to roll on each other and to guide thereby the swashplate movement of the tumbler-bell, one of the annular surfaces being fixed relatively to said casing, the other annular surface being fixed relatively to said tumbler-bell, and means for centering the tumbler-bell relatively to the fixed rolling surfaces and preventing a movement of the tumbler bell in a radial direction.

11. In a gas meter, the combination of a casing, a tumbler-bell movably arranged therein, means whereby the flow of fluid through said casing causes swashplate movement of the bell, a pair of annular smooth surfaces located adjacent the circumference of the tumbler-bell adapted to roll on each other and to guide thereby the swashplate movement of the tumbler-bell, one of the annular surfaces being fixed relatively to said casing, the other annular surface being fixed relatively to said tumbler-bell, and means for centering the tumbler-bell relatively to the fixed rolling surfaces and preventing a movement of the tumbler-bell in a radial direction, said means comprising guide surfaces engaging with the tumbler-bell.

12. In a gas meter, the combination of a casing, a tumbler-bell movably arranged therein, means whereby the flow of fluid through said casing causes swashplate movement of the bell, a pair of annular smooth surfaces located adjacent the circumference of the tumbler-bell adapted to roll on each other and to guide thereby the swashplate movement of the tumbler-bell, one of the annular surfaces being relatively fixed to said casing, the other annular surface being relatively fixed to said tumbler-bell, and means for ensuring the central position of the tumbler-bell relatively to the fixed rolling surfaces and preventing a movement of the tumbler-bell in a radial direction, said means comprising a universal joint serving to guide the tumbler-bell on the casing and being situated at the center of the swashplate movement of said bell.

13. In a gas meter, the combination of a casing, a tumbler-bell movably arranged therein, means whereby the flow of fluid through said casing causes swashplate movement of the bell, a pair of circular smooth surfaces adapted to roll on each other and to guide thereby the swashplate movement of the tumbler-bell, one of the surfaces being fixed relatively to said casing, the other surface being fixed relatively to said tumbler-bell, and means for ensuring the central position of the tumbler-bell relatively to the fixed rolling surfaces and preventing a movement of the tumbler-bell in a radial direction, said means comprising a universal combined Cardan-and-ball joint serving to guide the tumbler-bell on the casing, one of the elements of the ball-joint being axially adjustable, the Cardan-joint being provided with two pairs of knife edge joints at right angles to each other.

14. In a gas meter, the combination of a casing, a tumbler-bell movably arranged therein, means whereby the flow of fluid through said casing causes swashplate movement of the bell, a pair of annular surfaces adapted to roll on each other and to guide thereby the swashplate movement of the tumbler-bell, one of the surfaces being relatively fixed to said casing, the other surface being relatively fixed to said tumbler-bell, and means for ensuring the central position of the tumbler-bell relatively to the fixed rolling surfaces and preventing a movement of the tumber-bell in a radial direction, said means comprising a knife edge Cardan-joint with two pairs of knife edge joints at right angles to each other.

15. In a gas meter, the combination of a casing, a tumbler-bell movably arranged therein, means whereby the flow of fluid through said casing causes swashplate movement of the bell, and a pair of annular smooth surfaces adapted to roll on each other and to guide thereby the swashplate movement of the tumbler-bell, one of the annular surfaces being fixed relatively to said casing, the other surface being fixed relatively to said tumbler-bell, one of said rolling annular surfaces being vertically adjustable relatively to the body to which it is fixed.

16. In a gas meter, the combination of a casing, a tumbler-bell movably arranged therein, means whereby the flow of fluid through said casing causes swashplate movement of the bell, and a pair of annular smooth surfaces located adjacent the circumference of the tumbler-bell adapted to roll on each other and to guide thereby the swashplate movement of the tumbler-bell, one of the annular surfaces being fixed relatively to said casing, the other surface being fixed relatively to said tumbler-bell, and said first-named means including a central support for said tumbler-bell.

17. In a gas meter, the combination of a casing, a tumbler-bell movably arranged therein, means whereby the flow of fluid through said casing causes swashplate movement of the bell, a pair of annular smooth surfaces located adjacent the circumference of the tumbler-bell adapted to roll on each other and to guide thereby the swashplate movement of the tumbler-bell, one of the annular surfaces being fixed relatively to said casing, the other surface being fixed relatively to said tumbler-bell, means for ensuring the continuity of the rolling contact of the annular surfaces rolling on each other, and guiding means for ensuring the central position of the tumbler-bell relatively to the fixed rolling surfaces and preventing a movement of the tumbler-bell in a radial direction.

18. In a gas meter, the combination of a casing, a tumbler-bell movably arranged therein, means whereby the flow of fluid through said casing causes swashplate movement of the bell, means for guiding the swashplate movement of said bell, a counting mechanism, and a device for transmitting said swashplate movement to said counting mechanism, said device comprising a vertically movable slide and adapted to operate on the counting mechanism and provided with adjustable stops, and a tappet on the tumbler-bell adapted to engage with said stops so as to give an adjustable-length feed-movement to said slide to be transmitted to the counting mechanism.

19. In a gas meter, the combination of a casing, a tumbler-bell movably arranged therein, means whereby the flow of fluid through said casing causes swashplate movement of the bell, a pair of annular surfaces adapted to roll on each other and to guide thereby the swashplate movement of the tumbler-bell, one of the annular surfaces being fixed relatively to said casing, the other surface being fixed relatively to said tumbler-bell, a counting mechanism, and a device for transmitting said swashplate movement to said counting mechanism, said device comprising a vertically movable slide and adapted to operate on the counting mechanism and provided with adjustable stops and a tappet on the tumbler-bell adapted to engage with said stops so as to give an adjustable-length feed-movement to said slide to be transmitted to the counting mechanism.

20. In a gas meter, the combination of a casing, a tumbler-bell movably arranged therein, means whereby the flow of fluid through said tumbler-bell and the casing causes swashplate movement of the bell, and a pair of smooth frusto-conical surfaces located adjacent the outer circumference of the tumbler-bell adapted to roll on each other and to guide thereby the swashplate movement of the tumbler-bell, one of the frusto-conical surfaces tapering upwardly and being fixed relatively to said casing, the other frusto-conical surface tapering downwardly and being fixed relatively to said tumbler-bell.

In testimony whereof we have affixed our signatures.

HANS BRANDL.
CARL MARISCHKA.